United States Patent [19]
Webb

[11] Patent Number: 5,968,215
[45] Date of Patent: Oct. 19, 1999

[54] COMBINED INLET OUTLET AIR FILTER ELEMENT

[75] Inventor: Stephen M. Webb, Gastonia, N.C.

[73] Assignee: Dana Corporation, Toledo, Ohio

[21] Appl. No.: 09/008,844

[22] Filed: Jan. 20, 1998

[51] Int. Cl.[6] .................................................. B01D 45/00
[52] U.S. Cl. ........................... 55/385.3; 55/478; 55/479; 55/482; 55/486; 55/500; 55/502; 55/529
[58] Field of Search ................................. 55/385.3, 478, 55/479, 482, 486, 500, 502, 529

[56] References Cited

U.S. PATENT DOCUMENTS

| | | |
|---|---|---|
| 2,665,627 | 1/1954 | Fager . |
| 2,980,208 | 4/1961 | Neumann ................................... 55/500 |
| 3,274,759 | 9/1966 | Bell, Jr. . |
| 3,798,879 | 3/1974 | Schmidt-Burbach et al. . |
| 3,810,350 | 5/1974 | Scholl ........................................ 55/500 |
| 4,371,322 | 2/1983 | Lorraine . |
| 4,725,290 | 2/1988 | Ohlmeyer et al. . |
| 4,799,944 | 1/1989 | Dixon et al. .............................. 55/500 |
| 4,874,517 | 10/1989 | Esch ......................................... 55/500 |
| 5,643,079 | 7/1997 | Miyata et al. ............................. 55/500 |

*Primary Examiner*—Jay H. Woo
*Assistant Examiner*—Minh-Chau T. Pham
*Attorney, Agent, or Firm*—Miller, White, Zelano, & Branigan, P.C.

[57] ABSTRACT

An air filter element for internal combustion engines includes a filter media having an inlet portion and an outlet portion positioned adjacent to one another, so that a single filter element may be used with an air filter assembly; the filter element having an inlet and an outlet openings in the same direction. The inlet and outlet portions of the filter element are sealed with a housing by a common peripheral gasket.

20 Claims, 2 Drawing Sheets

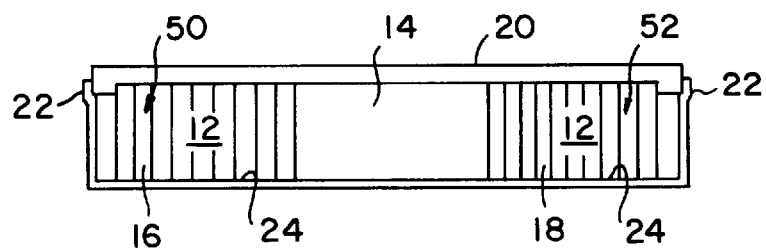
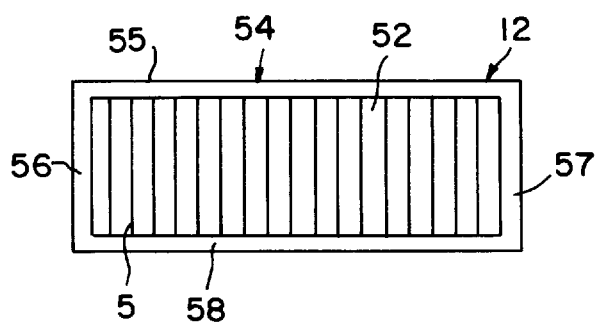
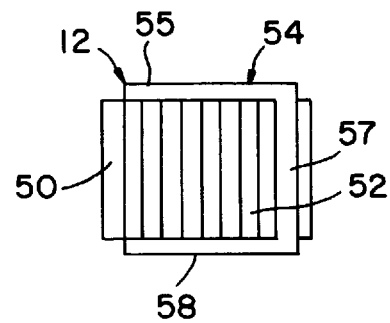
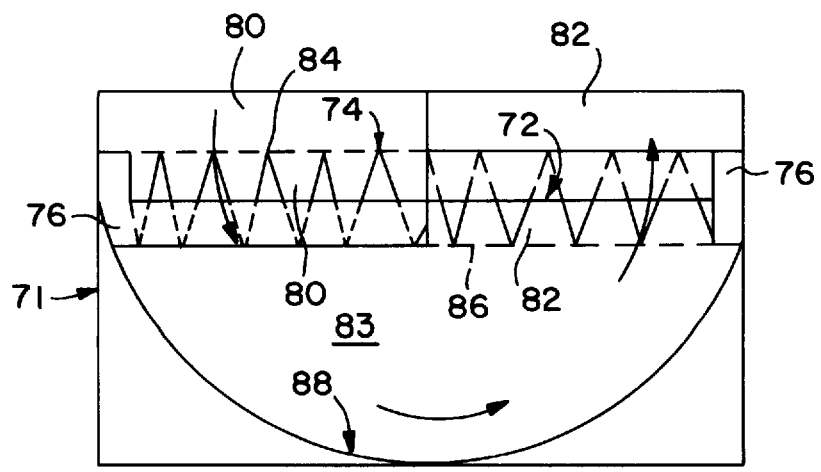

COMBINED INLET OUTLET AIR FILTER ELEMENT

The present invention is directed to a combined inlet outlet filter element, more particularly, the present invention is directed to a combined inlet outlet air filter element for internal combustion engines.

BACKGROUND OF THE INVENTION

Almost all air filter arrangements for internal combustion engines utilized a single stage air filter wherein dirty air enters the filter media on one side and emerges as clean air on the other side. Currently, there is interest in air intake filters which have spaced filter media wherein there is a first filter media for filtering out relatively large entrained particles and a second filter media for filtering out relatively small particles. By providing such an arrangement the capacity of filter elements is increased, the life of the filter elements is extended, the filter efficiency is increased and filter restriction is reduced.

Typically, the filters are arranged in tandem or series so that the second filter is aligned with the first filter whereby air passing through the first filter generally does not change direction to go through the second filter. Since the filters are separated there is now consideration given to just where the first and second filters should be placed in order to enhance the air cleaning process, preferably in an economical fashion.

While filtering air for internal combustion engines is one use to which multi-stage filters are put, such filters may be of use in filtering cabin air for vehicles or for filtering air or gases occurring in other situations such as enclosures in the form of rooms or buildings.

SUMMARY OF THE INVENTION

It is a feature of the present invention to provide a new and improved filter arrangement.

In a broad aspect, the present invention is directed to a filter element which comprises a filter media having a first portion and a second portion adjacent to but not aligned with the first portion, both portions being surrounding a common peripheral seal.

In a more specific aspect, the filter is an air filter.

In a still more specific aspect the filter media portions are project in opposite directions from the common peripheral seal and are comprised of pleated material.

In a further aspect of the invention, the invention is directed to an air filter for internal combustion engines comprising a housing, filter media and seal surrounding the filter media. The housing has an inlet and an outlet both facing in substantially the same direction and separated by a partition. The housing includes a chamber connecting the inlet to the outlet for reversing the direction air flow into the housing with the filter media disposed between the inlet and the outlet.

Preferably, the filter media is disposed adjacent both the inlet and outlet and the seal is a common seal disposed around the filter media for sealing with the housing. Preferably, the filter media portions are recessed in the housing so as to define inlet and outlet plenums with the filter media projecting from the seal toward the direction of air flow.

In any aspect of this invention the filter media may have a number of configurations and be made of various materials such as pleated cellulose, spun bonded polyester, or expanded foam materials.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a front view of the filter assembly of FIG. 1;

FIG. 3 is a front view of the filter element used with the filter assembly of FIGS. 1 and 2;

FIG. 4 is a side view of the filter element of FIG. 3; and

FIG. 5 is a top view of a second embodiment of the invention.

DESCRIPTION OF THE PREFERRED EMBODIMENTS

Figure 1:
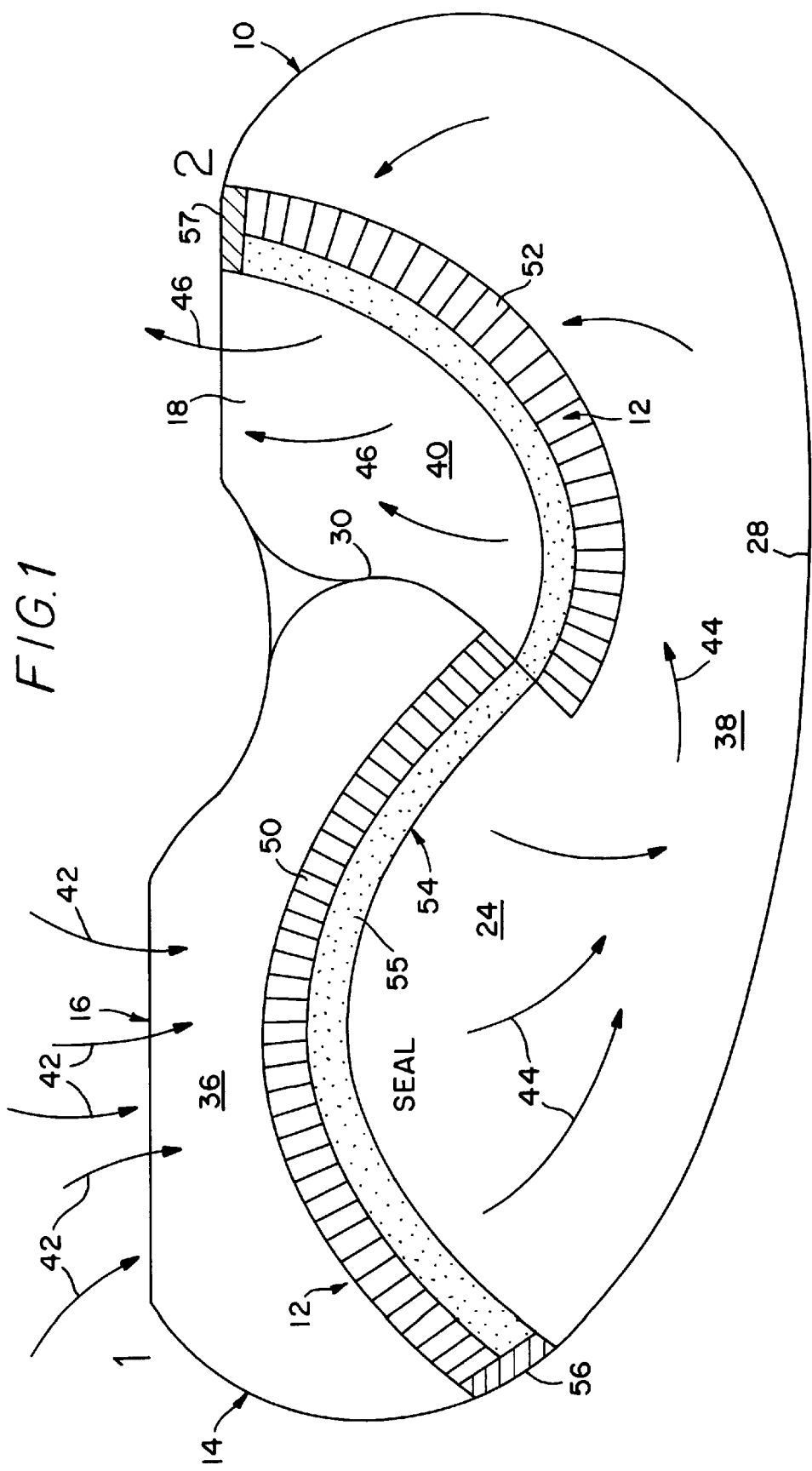
FIG. 1 is a top view of a filter assembly using a filter element configured in accordance with the present invention, and showing a housing having the top cover removed.

Referring now mainly to FIGS. 1 and 2, there is a shown a filter assembly 10 which utilizes a filter element 12 configured in accordance with the features of the present invention. The filter assembly 12 includes a housing 14 having an inlet 16 and an outlet 18. The housing 14 has a lid 20 which is held clamped to the housing by latches or other fasteners 22. The housing includes a floor 24, a front wall 26 and a concave rear wall 28. A flow separating partisan 30 extends inwardly from the front wall 26 to divide the inlet 16 from the outlet 18. A filter media 12 divides the housing 14 into three areas: an inlet plenum 36; a flow reversal chamber 38; and an outlet plenum 40. Inlet air illustrated by arrows 42 enters the inlet opening 16 flows through the inlet plenum 36 and then is filtered by the filter media 12 before entering the flow reversal chamber 38. The concave rear wall 28 of the flow reversal chamber 38 directs now partially cleaned air identified by arrows 44 back through the filter element 12 where it is cleaned again and exists into outlet plenum 40 before passing through the outlet 18 as illustrated by arrows 46.

Referring now mainly to FIGS. 3 and 4, the filter media 12 is divided into a filter media first portion 50 disposed adjacent to the inlet plenum and a filter media second portion 52 disposed adjacent to the outlet plenum 40. The first filter media portion 50 projects toward the inlet plenum 36 while the second filter media portion 52 projects toward the flow reversal chamber 38. Preferably the projections are convex. Surrounding the periphery of the filter media 12 is a peripheral seal 54 having a top portion 55, side portions 56 and 57 and a bottom portion 58. As is seen in FIG. 1, the peripheral seal 54 when viewed from the top or the bottom has a sinusoidal shape with the end portions 56 and 57 engaging the wall 28 of the housing; the top portion 58 engaging the floor 24 of the housing, and the top portion 55 being engaged by the lid 20. Thus, the peripheral seal 54 provides completely gasketry sealing the periphery of the filter media 12 so that air passing from the inlet 16 to the outlet 18 of the housing must pass twice therethrough.

In a preferred arrangement, the first portion 50 of the filter media removes relatively large particles from the air stream while the second portion 52 removes smaller particles as the air stream moves through the flow reversal chamber 38, some of the particles entrained therein are precipitated out of the air stream upon striking the wall 28 due to the centrifuge motion of the stream as it changes direction 180°.

In preferred embodiment both the filter media first portion 50 and filter media second portion 52 are comprised of pleated cellulose. Alternatively, other types of filter media maybe employed in a pleated configuration such as spun bounded polyester. If necessary or desired, the filter media first portion 50 and the filter media second portion 52 may be made of different materials and have different configurations. For example, the filter media first portion 50 may be of an expanded foam material, while the outlet filter media portion 52 may be of pleated cellulose. It is preferable that regardless of filter media configuration and characteristics, a continuous peripheral seal 54 is utilized so that the filter media 12 is a unit which is conveniently replaceable by removing the lid 20.

Referring now to FIG. 5, there is shown a second embodiment of the invention in which an air filter assembly 70 include a housing 71 with a filter element 72 mounted therein. The filter element 72 includes a filter media 74 which is sealed around its entire periphery and with respect to the housing by a common sealing gasket 76 which is integral with the filter element. The filter media 74 has a first portion 80 adjacent an inlet and a second portion 82 facing in the opposite direction toward the interior of the housing 71. The first portion 80 and section portion 82 have flat upstream face portions 84 and 86, respectfully, instead of convex upstream faces, as in the case with the filter assembly 12 of FIGS. 1–4. Otherwise, the air filter assembly 70 has substantially similarities to the filter assembly 10 because the housing 71 has an accurate rear wall 88 which turns an airstream 90 one hundred eighty degrees.

While the specific embodiment described for the filter 10 is a filter for internal combustion engines, the configuration of the filter may be employed for other purposes such as a filter for cabin air or for other enclosures such as buildings or rooms.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An air filter useful for filtering air used in internal combustion engines comprising:

a housing having an inlet and an outlet both facing in substantially the same direction and separated by a partition, the housing including a chamber connecting the inlet to the outlet for reversing the direction of air flow in the housing, the housing having an inner wall surface, filter media disposed in the housing, the filter media having a first portion for filtering air entering the inlet and a second portion for filtering air exiting the chamber through the outlet, whereby the air is filtered twice, the portions having peripheries;

gasketing around the peripheries of the portions of the filter media for sealing with the inner wall surface of the housing.

2. The air filter of claim 1 wherein the filter media is disposed adjacent both the inlet and outlet and wherein a the gasketing is a common seal disposed around the first and second portions of the filter media.

3. The air filter of claim 2, wherein the first portion and second portion project in opposite directions from the common seal.

4. The air filter of claim 3 wherein the chamber of the housing has an inner wall with an arcuate surface that is concave with respect to the filter media portions.

5. The air filter of claim 4 wherein the filter media portions are recessed in the housing to define inlet plenum and outlet plenum.

6. The air filter of claim 5 wherein the first portion of the filter media has a convex profile with respect to the inlet plenum and wherein the second portion of the filter media portion has a convex profile with respect to the chamber.

7. The air filter of claim 6 wherein the filter media is a pleated filter media.

8. The air filter of claim 1 wherein the filter media is a pleated filter media.

9. An air filter element for use in an air filter housing having an inlet and an outlet facing in the same direction, comprising:

a filter media having a first portion and a second portion, the first portion being adjacent to but not aligned with the second portion; the first portion being adapted for positioning adjacent the inlet of the housing for filtering inlet air and the second portion being adapted for positioning adjacent to the outlet of the housing to filter air which has passed through the housing before the air exits the housing through the outlet, whereby the air is filtered twice; and a peripheral seal around both the first and second portions of the filter media.

10. The air filter element of claim 9 wherein the filter media portions are projected from the seal in opposite directions with respect to one another.

11. The air filter element of claim 10 wherein the filter media is comprised of pleated material.

12. The air filter element of claim 9 wherein the filter media is comprised of pleated material.

13. The air filter element of claim 9 wherein the filter media has a flat inlet face plane and a flat outlet face plane.

14. The air filter element of claim 13 wherein the filter media is a pleated filter media.

15. The air filter element of claim 9 wherein the air being filtered is combustion air for an internal combustion engine.

16. The air filter element of claim 9 wherein the air being filtered is air for an enclosure.

17. The air filter element of claim 16 wherein the enclosure is a cabin for a vehicle.

18. The air filter element of claim 16 wherein the enclosure is a room.

19. The air filter element of claim 16 wherein the enclosure is a building.

20. The air filter of claim 9, wherein the first and second portions are convex with with the first portion adapted to project toward the inlet and the second portion adapted to project into the housing.

* * * * *